United States Patent [19]
Kundermann

[11] Patent Number: 4,926,988
[45] Date of Patent: May 22, 1990

[54] HYDRODYNAMIC CLUTCH

[75] Inventor: Wolfgang Kundermann, Schweinfurt, Fed. Rep. of Germany

[73] Assignee: Fichtel & Sachs AG, Schweinfurt, Fed. Rep. of Germany

[21] Appl. No.: 375,815

[22] Filed: Jul. 5, 1989

[30] Foreign Application Priority Data

Jul. 8, 1988 [DE] Fed. Rep. of Germany ....... 3823210

[51] Int. Cl.⁵ .............................................. F16D 33/00
[52] U.S. Cl. .................................... 192/3.3; 192/3.33; 192/106.2
[58] Field of Search ................ 192/3.29, 3.3, 3.31, 192/3.33, 106.2

[56] References Cited

U.S. PATENT DOCUMENTS

| | | | |
|---|---|---|---|
| 2,737,824 | 3/1956 | Livermore | 192/3.33 |
| 4,177,885 | 12/1979 | Ross | 192/3.3 |
| 4,240,532 | 12/1980 | Blomquist | 192/106.2 |
| 4,471,438 | 9/1984 | Futagi et al. | 364/424.1 |
| 4,510,747 | 4/1985 | Yoshida | 192/3.29 |
| 4,582,185 | 4/1986 | Grimes et al. | 192/3.3 |

FOREIGN PATENT DOCUMENTS 853389 11/1960 United Kingdom .
894109 4/1962 United Kingdom .

Primary Examiner—Rodney H. Bonck
Assistant Examiner—Andrea Pitts
Attorney, Agent, or Firm—Toren, McGeady & Associates

[57] ABSTRACT

This invention relates to the construction of the bridging clutch of a hydrodynamic clutch or torque converter, which is constructed with an additional friction disc for the purpose of increasing the transmission capability or reducing the internal pressure. For reducing the load on the casing on the torque converter, the piston of the bridging clutch is mounted on the drive-side casing wall and is connected to this wall in torque-fast manner.

16 Claims, 5 Drawing Sheets

HYDRODYNAMIC CLUTCH

BACKGROUND OF THE INVENTION

From the U.S. Pat. No. 4,471,438 a hydrodynamic torque converter is known, the bridging clutch of which comprises a piston, which is guided axially displaceably on the turbine wheel hub and is sealed with respect to the hub. The piston forms, in the region of its external diameter opposite a drive-side casing wall of a converter casing, an engageable friction connection, which makes possible the direct transmission of torque from the casing to the turbine wheel by by-passing the hydrodynamic circuit. When the bridging clutch is disengaged the axial support of the piston is provided at a step of the turbine wheel hub. In this operating condition, the oil circuit of the converter is subjected to fluid pressure from the space between the piston and the drive-side casing wall, with the result that the piston is released and the converter fluid escapes via the converter chamber to a storage container. For engaging the bridging clutch, the direction of flow of the fluid is reversed. The fluid now supplied from the converter chamber produces a pressure difference relative to the piston chamber, which presses the piston axially against a friction surface on the drive side casing wall and the bridging clutch is closed. In particular, when the bridging clutch is opened, the casing of the converter is heavily loaded, because the axial force acting on the piston is transmitted directly to the casing wall remote from the drive side. Furthermore, the torque transmission capability of such a bridging clutch is limited by the value of the internal pressure, which on the one hand loads all the seals and on the other hand attempts to expand the entire casing.

It is the object of the present invention to improve a torque converter of the above named type of construction so that, on the one hand, either the transmission capability of the bridging clutch can be increased, without a pressure increase in the converter liquid being necessary, or, for the same transmission capability, the pressure can be reduced and, on the other hand, a lower loading for the casing can be achieved.

SUMMARY OF THE INVENTION

According to the invention at least one friction blade or friction disc is provided between piston and casing. The friction disc is connected torsionally fixed with the turbine wheel or the turbine wheel hub respectively, and doubles the transmission surface of the bridging clutch so that either, for the same internal pressure, twice the transmission capability is achieved or, for the same transmission capability, the pressure can be considerably reduced. The piston is guided on a guide hub, which is mounted on the drive-side casing wall and is provided with an axial stop. This results in a relief of load on the clutch casing in the open position of the bridging clutch, because the axial force is accepted directly by the guide hub and is no longer transmitted as far as the drive-remote casing wall.

In a preferred embodiment the torsionally fixed connection of the piston to the casing may be effected, for example, via an external set of teeth of the guide hub and a corresponding internal set of teeth of a hub disc which is connected with the piston by tangential leaf springs. By this measure, a very favorable behavior of the piston during the closing and opening operations is obtained, because friction forces produced in the sets of teeth by the torque transmission can exert only a small influence upon the piston movement.

The torque entraining of the piston may also be produced via an angle ring mounted on the casing and having an external set of teeth, into which a hub disc, which is firmly connected with the piston, engages with a corresponding internal set of teeth. By a nesting arrangement of piston flange and angle ring an axially space-saving solution can be achieved here.

Where an additional support ring is used, the torque-fixed connection between the piston and the drive-side casing wall can be made of relatively large diameter. The support ring, fixed to the inside of the casing wall is provided with a friction surface and openings in which noses of an entraining ring mounted firmly on the piston are engaged for torque transmission to the piston. The support ring and the casing have conical zones with different cone angles, so that between these two zones an annular gap exists, into which the axially cranked noses of the entraining ring can extend. With this type of torque transmission, the axial space requirement is also relatively small and the force at the force transferring components is also low, due to the large diameter. Furthermore, the support ring reinforces the casing in this region.

The piston and the entraining ring may bulge away from one another radially outside their fixing region, in order to form a space for the axially extending noses of the entraining ring. With such a construction, a larger number of friction discs can be arranged axially one behind another in a very simple manner, in order either to increase the transmission capability of the bridging clutch or to reduce the internal pressure for actuating the briding clutch.

The torque transmission between the friction strip or strips and the turbine wheel is advantageously effected via a hollow cylindrical component of simple construction, which at the turbine wheel side is adapted to the external contour of the turbine wheel and is welded to the turbine wheel and at the other end zone possesses slits for the torque-fixed connection with corresponding noses of the frictions discs. This hollow cylindrical component may contain a torsional vibration damper which comprises several helical springs, arranged generally tangentially to the axis of rotation, which springs, when the bridging clutch is engaged, accept the torsional vibrations issuing from the internal combustion engine.

The various features of novelty which characterize the invention are pointed out with particularity in the claims annexed to, and forming a part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention is now explained in greater detail by reference to a drawing.

DESCRIPTION OF PREFERRED EMBODIMENTS

Figure 1:
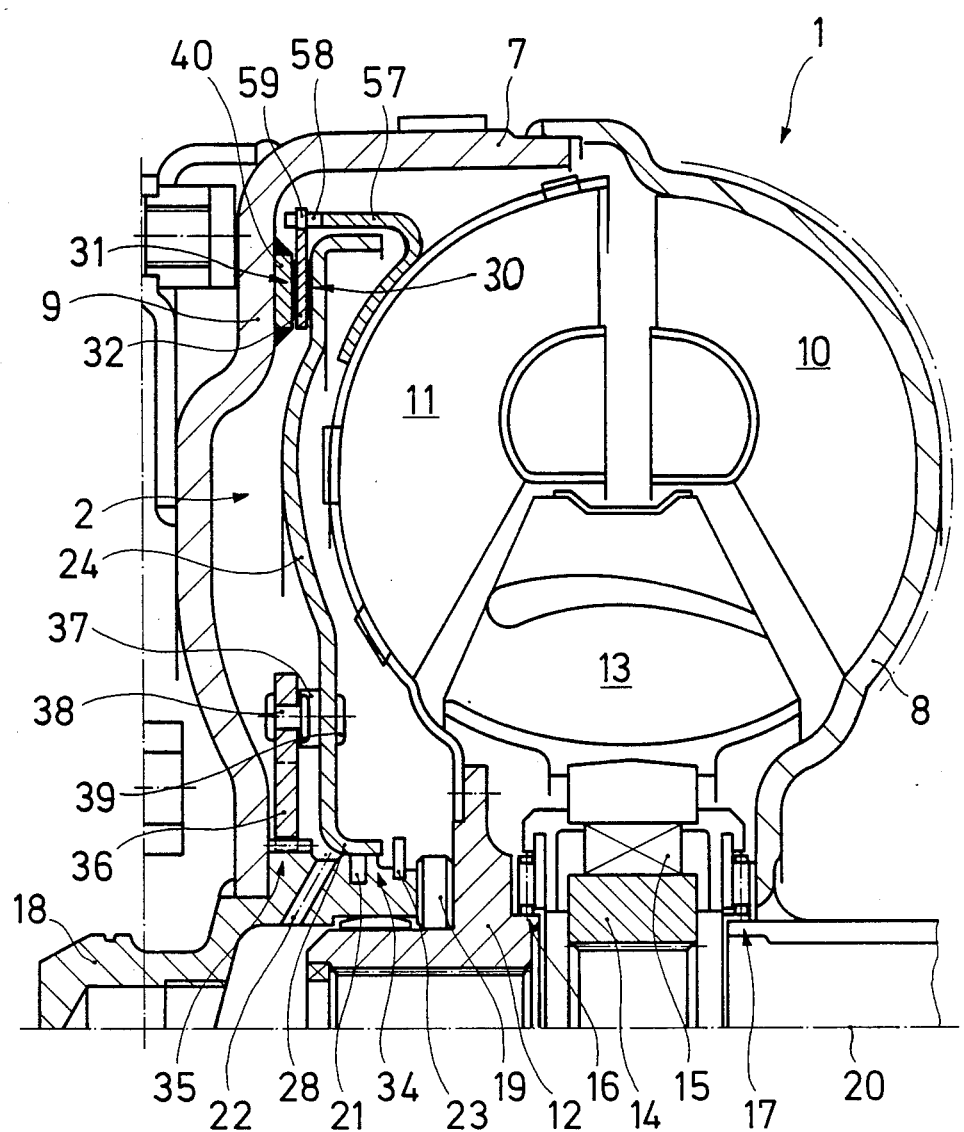
FIGS. 1 to 5 each show the upper half of a longitudinal section through examples of embodiment of hydrodynamic torque converters, different constructional arrangements being illustrated, especially in the region of the torque transmission between the casing and the piston.

FIG. 1 shows the upper half of the longitudinal section through a hydrodynamic torque converter 1, which is arranged concentrically about an axis of rotation 20. An internal combustion engine, not illustrated, is situated at the left side and rotatingly drives a casing 7 of the converter 1. The casing 7 comprises a drive-side casing wall 9 and a drive-remote casing wall 8. The casing wall 9 is firmly connected, in its radially inner zone, with a guide hub 18, which is radially guided by an extension in the flywheel or in the crankshaft of the internal combustion engine. The drive-remote casing wall 8 is combined with a pump wheel 10 of the converter 1 to form one unit. Between the pump wheel 10 and the drive-side casing wall 9, a turbine wheel 11 is disposed, which is firmly connected with a turbine wheel hub 12 which is mounted by a set of teeth on a take-off shaft, not illustrated. Between the turbine wheel 11 and the pump wheel 10 a guide wheel 13 is disposed, which is guided by a freewheel 15 on a rotor hub 14, which is mounted by a set of teeth on a tube, not illustrated, fixed to the casing. Between the turbine wheel 11 and the drive-side casing wall 9, a piston 24 of a bridging clutch is disposed. The piston 24 is axially slidably mounted by a flange 28, pointing away from the casing wall 9, on a guide step 34 of the guide hub 18 and is sealed against the hub 18 by a seal 21. In the region of its external diameter, the piston 24 is provided with a stiffening flange pointing away from the casing wall 9 and a friction surface 30, facing towards the casing wall 9. In this diameter region, on the inner face of the casing wall 9, a friction plate 40 is preferably welded on, which plate possesses a friction surface 31, which is exactly opposite the friction surface 30 of the piston 24. Between these two friction surfaces 30 and 31, a friction blade or disc 32 is disposed, which extends radially outwards beyond the piston 24 and comprises is radially guided by an extension in the flywheel or in the crankshaft of the internal combustion engine. The drive-remote casing wall 8 is combined with a pump wheel 10 of the converter 1 to form one unit. Between the pump wheel 10 and the drive-side casing wall 9, a turbine wheel 11 is disposed, which is firmly connected with a turbine wheel hub 12 which is mounted by a set of teeth on a take-off shaft, not illustrated. Between the turbine wheel 11 and the pump wheel 10 a guide wheel 13 is disposed, which is guided by a freewheel 15 on a rotor hub 14, which is mounted by a set of teeth on a tube, not illustrated, fixed to the casing. Between the turbine wheel 11 and the drive-side casing wall 9, a piston 24 of a bridging clutch is disposed. The piston 24 is axially slidably mounted by a flange 28, pointing away from the casing wall 9, on a guide step 34 of the guide hub 18 and is sealed against the hub 18 by a seal 21. In the region of its external diameter, the piston 24 is provided with a stiffening flange pointing away from the casing wall 9 and a friction surface 30, facing towards the casing wall 9. In this diameter region, on the inner face of the casing wall 9, a friction plate 40 is preferably welded on, which plate possesses a friction surface 31, which is exactly opposite the friction surface 30 of the piston 24. Between these two friction surfaces 30 and 31, a friction blade or disc 32 is disposed, which extends radially outwards beyond the piston 24 and comprises there noses 59, for the torque-fast but axially loose connection with slits 58 of a hollow cylindrical component 57, which is firmly connected with the turbine wheel 11. The hollow cylindrical component 57 is adapted, in its region remote from the slits 58, partly to the external contour of the turbine wheel 11 and in this region is firmly connected to the outer shell of the turbine wheel 11, for example by a weld seam. For the torque-fast connection between the piston 24 and the casing 9, an external set of teeth 35 is disposed at the external periphery of the guide hub 18 in the region between these two components, into which set of teeth a hub disc 36 is engaged with a corresponding internal set of teeth to provide torque fixity but axial sliding. The hub disc 36 is connected with the piston 24 by a plurality of tangential leaf springs 37, distributed around the circumference and being mounted by rivets 38, 39. Furthermore the guide hub 18 is provided in the region between the seal 21 and the casing wall 9, with a duct 22, which serves for the feed of pressurized converter fluid. In addition, between the drive-remote casing wall 8 and the turbine wheel hub 12, on each side of the rotor hub 14, a thrust bearing 16, 17 respectively is disposed, and between the turbine wheel hub 12 and the guide hub 18, a thrust ring 19 is disposed.

The functioning of the bridging clutch in the hydrodynamic torque converter is now as follows; during torque transmission from the pump wheel 10 to the turbine wheel 11, the bridging clutch is opened by converter fluid being admitted under pressure via the duct 22, between the drive-side casing wall 9 and the piston 24, which causes the piston 24 to be displaced axially towards the turbine wheel 11, until the flange 28 comes into bearing against a securing ring 23, which is set in a corresponding groove of the guide hub 18. As a consequence, the friction disc 32 is disposed freely between the friction surfaces 30 and 31 and can revolve freely with the turbine wheel 11. By the axial force support of the piston 24 provided by the securing ring 23 on the guide hub 18, the drive-remote casing wall 8 is relieved of this axial force, in contrast to the state of the art. The casing 7 of the converter is thus substantially relieved of load, and of the danger of expanding of the casing 7. For engaging the bridging clutch 2, the internal space of the torque converter 1 is pressurized by connecting it to the delivery side of a converter fluid pump not shown and the space between the casing wall 9 and the piston 24 is relieved of pressure via the duct 22, so that a pressure difference is produced, which moves the piston 24 towards the left onto the casing wall 9, causing the friction surfaces 30 and 31 to clamp the friction disc 32 between them. During the engagement of the bridging clutch 2, sealing takes place at the friction surfaces 30 and 31, so that the pressure in the converter can automatically build up. The transmission of the torque now takes place directly from the casing wall 9, via the friction plate 40, to the friction surface 31 and, via the hub disc 36, the tangential leaf springs 37 and the piston 24, to the friction surface 30, with the result that the friction strip 32 can transfer the torque to the component 57 and thus to the turbine wheel 11. The torque is thus transmitted, one half at the friction surface 31 and one half at the friction surface 30. As a consequence, the torque transmission to the piston 24 via the set of teeth 35 only needs to be one half of the value of the total torque.

Figure 2:
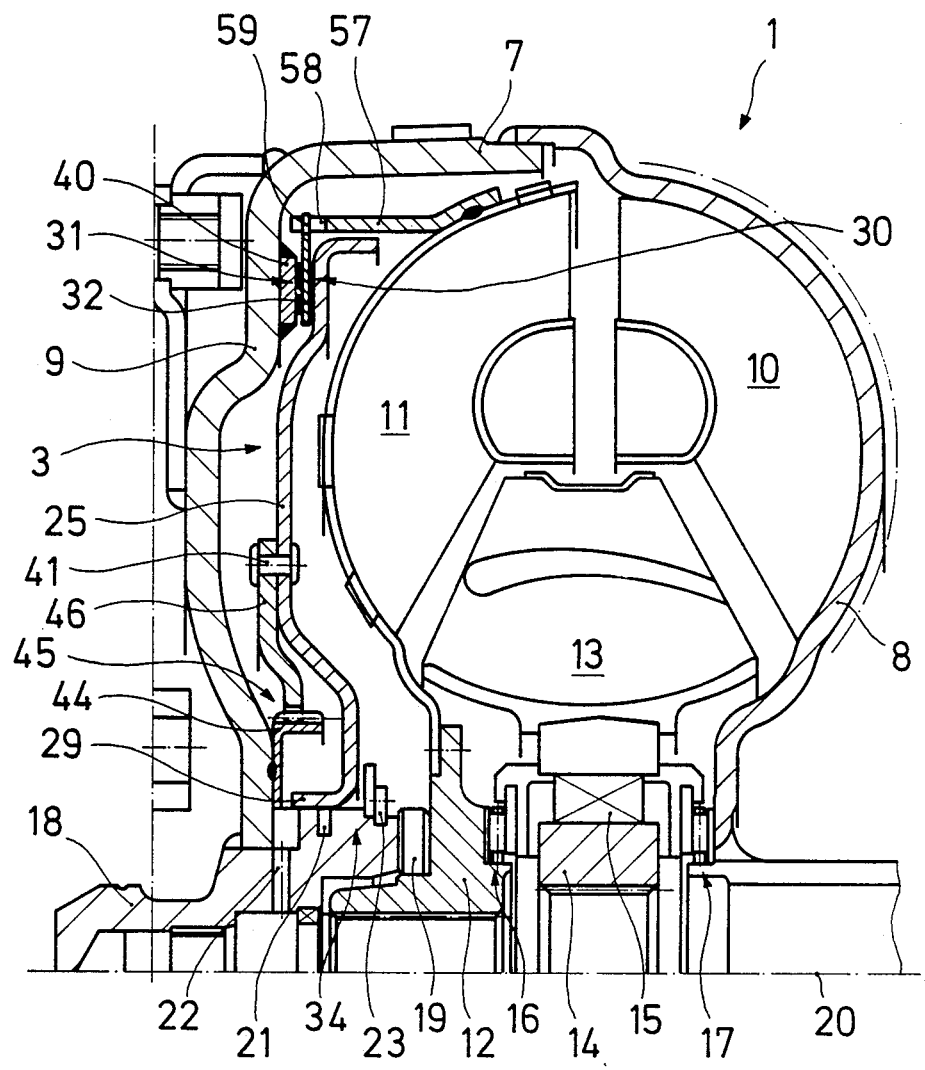

FIG. 2 shows, analogously to FIG. 1, a torque converter 1 having a bridging clutch 3, in which as compared with FIG. 1 only the force transmission from the drive-side casing 9 to a piston 25 is differently arranged and the other components are given the same references. In FIG. 2, the torque transmission takes place from the drive-side casing wall 9 to an angle ring 44, which is welded to the casing wall 9 near the guide hub 18 and is furnished in its axially projecting radially outer region with an external set of teeth 45. Into this external set of teeth 45 a hub disc 46 engages with a corresponding internal set of teeth. The hub disc 46 is firmly connected to the piston 25 by rivets 41. The piston 25 possesses, in its radially inner zone, a flange 29, which is cranked towards the casing wall 9 and thus extends radially inside the region of the external set of teeth 45 of the angle ring 44, in space-saving manner. The other components correspond to those of FIG. 1 and they also have the same functions, so that further explanation is unnecessary here.

Figure 3:
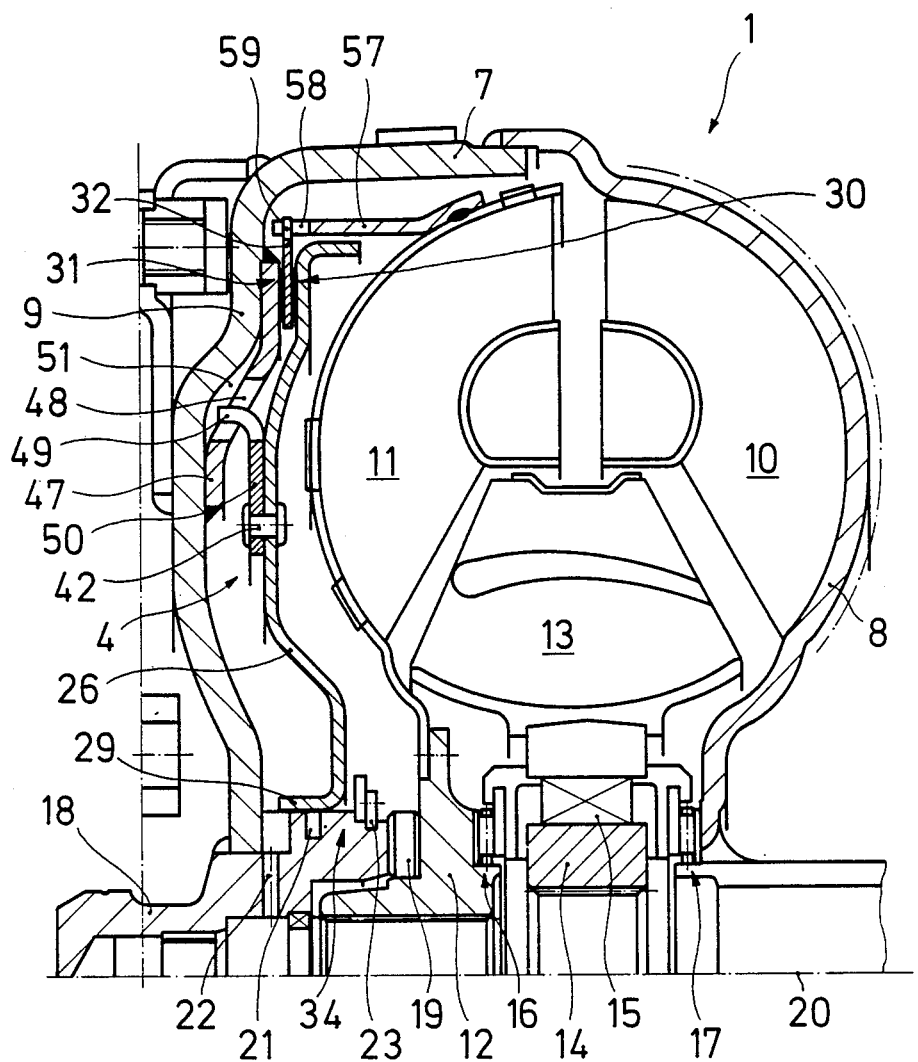

FIG. 3 shows a further variant of the force transmission between the drive-side casing wall 9 and a piston 26, the torque transmission in the present case being shifted to a larger diameter and thus taking place closely adjacent to and radially inside the friction disc 32. The piston 26, correspondingly to its previously described arrangement, is seated with its flange 29 slidably on the guide step 34 of the guide hub 18 and is sealed by the seal 21. In the axial direction, it is exactly fixed in its opening direction by the securing ring 23 acting as a stop. To the driveside casing wall 9, in the region of the friction surface 31, a support ring 47 is welded which continues radially inwards, starting from the friction surface 31. Both the support ring 47 and also the casing wall 9 are of conical form in the region radially inside the friction surface 31, but with different cone angles. As a result, an annular gap 51 is formed between the external diameter and the internal diameter of the support ring 47 and opposite the casing wall 9. In this region, the support ring 47 possesses openings 48, which are constructed for the torque-fast, but axially slidable entraining of noses 49, which are a part of an entraining ring 50, which is firmly attached to the piston by rivets 42. Thus, in the case of the bridging clutch 4 present here, one half of the torque to be transmitted by the bridging clutch to the piston 26 is transmitted at a relatively large diameter. As a consequence, the forces in this region are relatively low and so also are the displacement forces.

Figure 4:
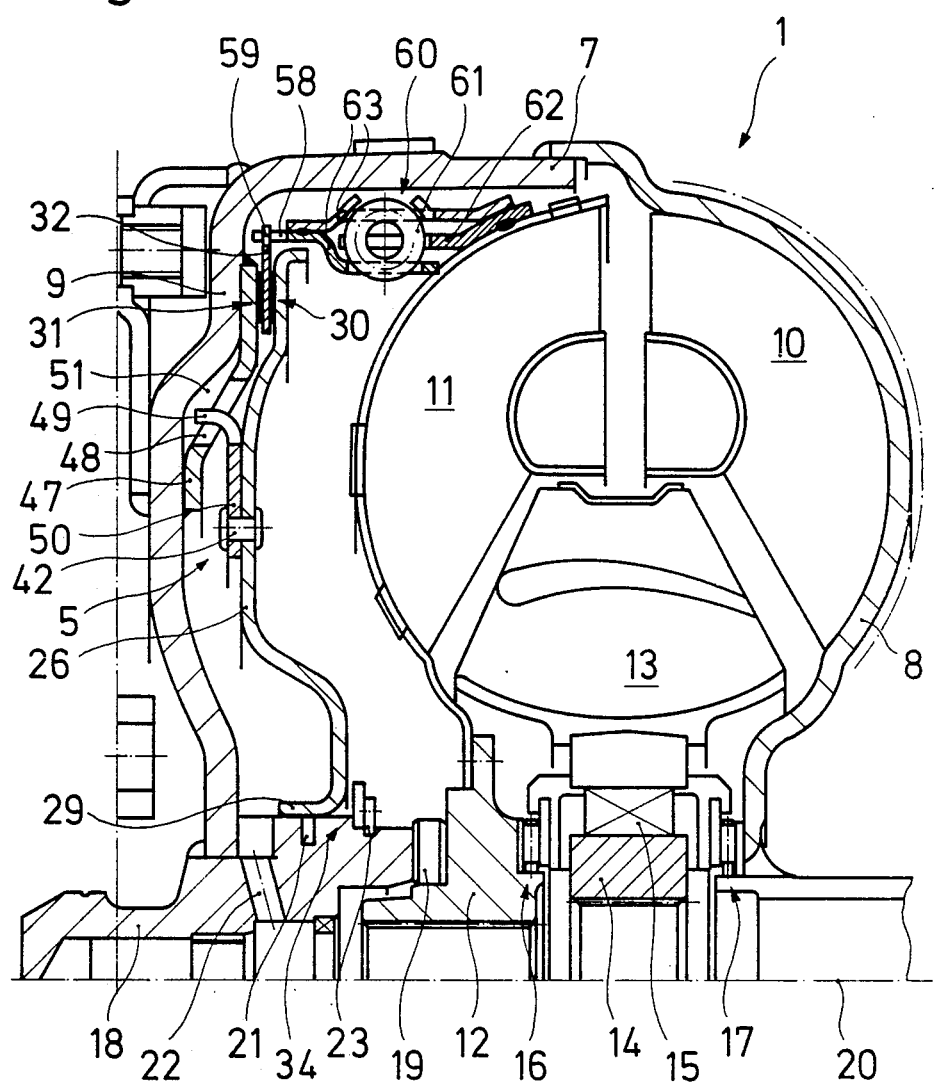

In FIG. 4, a variant of FIG. 3 is illustrated, in which a bridging clutch 5 of the torque converter 1 is connected with the turbine wheel 11 via a torsional vibration damper 60. The provision of a torsional vibration damper is in principle independent of the construction of the bridging clutch, but it is desirable in the standard case, to enable torsional vibrations of the internal combustion engine to be kept away from the drive train of the automobile when the bridging clutch is engaged. In the present case, a hub component 62 is provided at the turbine wheel 11, which component has a form similar to the form of the hollow cylindrical component 57 according to FIGS. 1 to 3. The hub component 62 comprises radially open windows, in which helical springs 61, distributed around the circumference, are diposed generally tangentially. On each side of the hub component 62, hollow cylindrical side components 63 are disposed, which also possess windows for receiving the helical springs 61. The two side components 63 are firmly connected to each other and at least one of them is continued in the axial direction and comprises slits 58 for the torque-fast connection with the noses 59 of the friction strip 32. The functioning of the bridging clutch 5 is known from the description relating to FIG. 3 and therefore does not need to be explained again.

Figure 5:
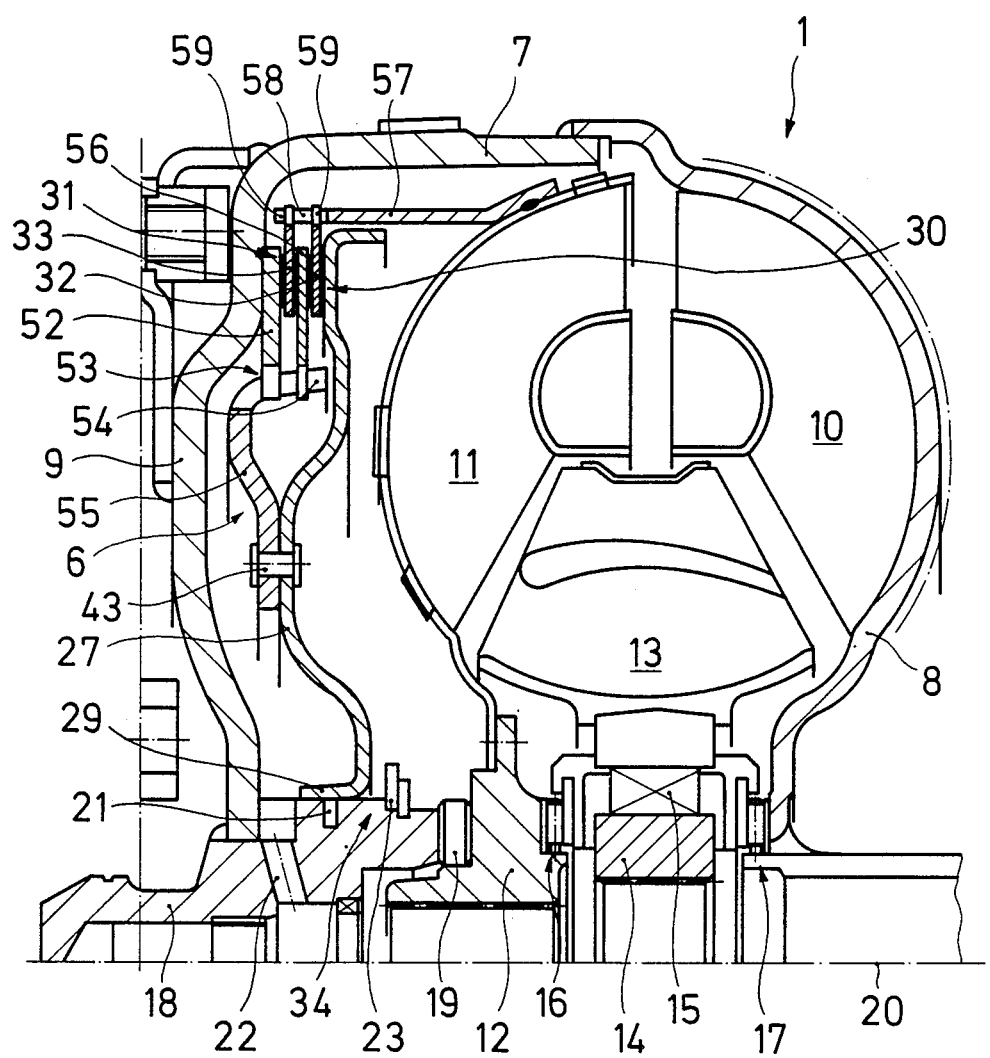

In FIG. 5 a torque converter 1 is illustrated, a bridging clutch 6 of which is constructed as a friction clutch, wherein, between the friction surfaces 30 and 31 of a piston 27 and of a ring 52 which is mounted on the inner face of the drive-side casing wall 9, two friction discs 32 and 33 and a further ring 56 are disposed. In a central region, the piston 27 is connected by rivets 43 to an entraining ring 55 and these two components bulge apart from each other radially outside the riveted zone. In the region of this bulging the entraining ring 55 possesses axially cranked noses 54, which point away from the drive-side casing wall 9 towards the piston 27. These noses 54 serve for the torque-fast connection of the entraining ring 55 with the casing wall 9, in that in the region of the friction surface 31 a ring 52 is mounted on the casing wall 9 and in that the ring 52 is provided in the region of its internal diameter, with an inner set of teeth 53, into which the noses 54 of the entraining ring 55 engage force-transmittingly but axially slidably. The noses 54 serve, additionally, for the torquefast and axially displaceable entraining of the ring 56. By this construction, it is possible to provide two friction discs 32 and 33, which engage with their noses 59 into the corresponding axial slits 58 of the hollow cylindrical component 57 in torque-fast but axially displaceable manner. This arrangement, which in other respects corresponds to the construction according to FIG. 3, is capable of either transmitting a still higher torque via the bridging clutch 6 or of achieving a further reduced internal pressure.

In all the constructional arrangements illustrated according to FIGS. 1 to 5, the piston is sealed against the drive-side mounted guide hub 18 but is axially slidably mounted, and in each case it bears, when the bridging clutch is open, against a securing ring, which also is disposed on the guide hub 18. As a result, a load-relief of the converter in the region of the drive-remote casing wall 8 is obtained, because the piston, loaded by the pressure of the hydraulic medium, can bear via the guide hub 18 against the drive-side casing wall 9. In addition, by the provision of the securing ring, an exact release clearance for the piston is provided, which on the one hand serves for adequate through-flow when the bridging clutch is opened and on the other hand, in the switch-over operation for closing the bridging clutch, assures the least possible delay.

The described bridging clutch can, of course, also be used with hydrodynamic clutches.

While specific embodiments of the invention have been shown and described in detail to illustrate the application of the inventive principles, it will be understood that the invention may be embodied otherwise without departing from such principles.

What I claim is:
1. A hydrodynamic clutch, especially hydrodynamic torque converter, comprising,
 a casing (7) rotatably driven about an axis of rotation (20) and having a drive-side casing wall (9) and a drive-remote casing wall (8),
 a pump wheel (10), firmly connected to the drive-remote casing wall (8),
 a turbine wheel (11), rotatably mounted relative to the casing (7) about the axis of rotation (20) between the pump wheel (10) and the drive-side casing wall (9), a bridging clutch (2; 3; 4; 5; 6) in the casing (7) between the turbine wheel (11) and the drive-side casing wall (9), said bridging clutch (2; 3; 4; 5; 6) comprising a guide hub (18) axially fixedly connected with the drive-side casing wall (9), a piston (24, 25; 26; 27) which is axially slidably guided in its radially inner zone on the guide hub (18) concentric to the axis of rotation (20) and is guided torsionally fixed relative to the casing (7) and is sealed relative to the guide hub (18), a stop (23) on the guide hub (18) for limiting the axial sliding movement of the piston (24; 25; 26; 27) relative to the drive-side casing wall (9) towards the turbine wheel (11), a first friction surface (30) in the radially outer zone of the piston (24; 25; 26; 27), a second friction surface (31) on the drive side-casing wall (9) opposite the first friction surface, at least one friction disc (32, 33) disposed between the first and the second friction surfaces (30, 31), which friction disc is in torque-fixed connection in the region of its outer circumference with the turbine wheel (11), and means for alternately subjecting a space between the drive-side casing wall (9) and the piston (24; 25; 26; 27) on the one hand, and a space between the drive remote casing wall (8) and the piston (24; 25; 26; 27) on the other hand to pressurized fluid for the purpose of opening and closing the bridging clutch (2; 3; 4; 5; 6).

2. A clutch according to claim 1, wherein the guide hub (18) has an external set of teeth (35) and wherein a hub disc (36) is disposed axially between the piston (24) and the drive-side casing wall (9), which hub disc is guided torsionally fixed on the guide hub (18) by means of an internal set of teeth engaging into the external teeth (35) and is connected with the piston (24) in torsionally fixed but axially movable manner by means of at least one tangential leaf spring (37).

3. A clutch according to claim 1, wherein an angle ring (44) is fixed to the drive-side casing wall (9), at the external periphery of which ring a cranked zone equipped with an external set of teeth (45) is provided and wherein the piston (25) is firmly connected with a hub disc (46), which engages by an internal set of teeth into the external set of teeth (45) of the angle ring (44).

4. A clutch according to claim 3, wherein the piston (25) possesses a flange (29) projecting to the angle ring (44) which flange guides the piston (25) slidably on the guide hub (18) and seals it via a sealing ring (21) of the guide hub (18) against the guide hub (18).

5. A clutch according to claim 1, wherein a support ring (47, 52), equipped with the second friction surface (31), is attached to the inner face of the drive-side casing wall (9) which support ring projects radially inwards beyond the region of the second friction surface (31) and possesses, in the projecting region, openings (48; 53), into which axially projecting noses (49; 54) of an entraining ring (50; 55) fixed to the piston (26; 27) engage, which guides the piston (26; 27) torsionally fixed on the support ring (47; 52).

6. A clutch according to claim 5, wherein the drive-side casing wall (9) possesses, in the region radially inside the second friction surface (31), a zone converging conically from the piston (26) towards the axis of rotation (20), and wherein the support ring (27) also possesses a conical zone, which overlaps the conical zone of the drive-side casing wall (9) and has a cone angle which relative to the rotational axis is larger than the cone angle of the concial zone of the drive-side casing wall (9), and possesses, in this region, openings (48) for the engagement of the noses (49) of the entraining ring (50), the conical zones of the support ring (47) and of the drive-side casing wall (9) forming between them an annular gap (51) for receiving the noses (49) of the entraining ring (50).

7. A clutch according to claim 6, wherein the support ring (47) is welded to the drive-side casing wall (9) both in region of its inner circumference and also of its outer circumference.

8. A clutch according to claim 5, wherein the support ring (52) possesses at its inner periphery an internal set of teeth (53), into which the noses (54) of the entraining ring (55) of the piston (27) engage torsionally fixed but axially displaceable.

9. A clutch according to claim 8, wherein the drive-side casing wall (9) possesses, radially inside the counter-friction surface (31), a conical divergence leading away from the piston (27), into which divergence the entraining ring (55) engages, the entraining ring (55) and piston (27) running at an axial distance from each other in the region of the divergence and the noses (54) of the entraining ring (55) being provided at its external periphery and projecting axially towards the piston (27).

10. A clutch according to claim 9, wherein between the friction surface (30) of the piston (27) and the counter-friction surface (31) of the support ring (52) several friction strips (32, 33) are disposed, between each of which a ring (56) is disposed, which is coupled, torsionally fixed but axially displaceable, by an internal set of teeth with the noses (54) of the entraining ring (55).

11. A clutch according to claim 1, wherein the turbine wheel (11) carries a substantially hollow cylindrical component (57) surrounding the piston (24; 25; 26; 27) which component is provided in the region of the friction strip (32, 33), with axially extending slits (58) into which noses (59) projecting radially from the friction strip (32, 33) engage.

12. A clutch according to claim 11, wherein the hollow cylindrical component (57) is welded directly onto the turbine wheel (11).

13. A clutch according to claim 12, wherein the hollow cylindrical component (57) has a fixing region bearing flat against the turbine wheel (11) and following its contour.

14. A clutch according to claim 1, wherein the guide hub (18) of the piston (24; 25; 26; 27) carries a securing ring (23) in a groove as a stop for the piston (24; 25; 26; 27).

15. A clutch according to claim 1, wherein a torsional vibration damper (60) is disposed in the torque transmission path between the friction disc (32; 33) and the turbine wheel (11).

16. A clutch according to claim 15, wherein the torsional vibration damper (60) comprises a substantially annular cylindrical hub component (62) and two substantially annular cylindrical side components (63), connected to each other to form one unit, which are disposed concentrically inside and outside the hub component (62) respectively, and wherein the side components (63) are coupled to the hub component (62) in torsionally elastic manner by at least one helical spring (61), which is disposed in mutually facing windows of the side components (63) and of the hub component (62) generally tangentially to these components (62, 63).

* * * * *